(12) United States Patent
Nakaminami

(10) Patent No.: US 9,798,611 B2
(45) Date of Patent: Oct. 24, 2017

(54) PROGRAMMABLE LOGIC CONTROLLER

(71) Applicant: Mitsubishi Electric Corporation, Tokyo (JP)

(72) Inventor: Kazuhiro Nakaminami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1 day.

(21) Appl. No.: 14/904,966

(22) PCT Filed: Apr. 25, 2014

(86) PCT No.: PCT/JP2014/061776
§ 371 (c)(1),
(2) Date: Jan. 14, 2016

(87) PCT Pub. No.: WO2015/162793
PCT Pub. Date: Oct. 29, 2015

(65) Prior Publication Data
US 2016/0253234 A1 Sep. 1, 2016

(51) Int. Cl.
G06F 11/00 (2006.01)
G06F 11/07 (2006.01)
G05B 19/05 (2006.01)

(52) U.S. Cl.
CPC ........ *G06F 11/0793* (2013.01); *G05B 19/058* (2013.01); *G06F 11/079* (2013.01);
(Continued)

(58) Field of Classification Search
CPC ............. G06F 11/0793; G06F 11/0736; G06F 11/0751; G06F 11/0772; G06F 11/0787; G06F 11/079; G05B 19/058
See application file for complete search history.

(56) References Cited

U.S. PATENT DOCUMENTS 5,111,383 A 5/1992 Kimura et al.
2007/0184684 A1 8/2007 Bormann et al.
(Continued)

FOREIGN PATENT DOCUMENTS

DE           3606518 A1    9/1987
DE    10 2004 010 003 A1  9/2005
(Continued)

OTHER PUBLICATIONS

Notice of Rejection issued Jul. 3, 2015 in JP Appln No. 2015-520757.
(Continued)

*Primary Examiner* — Philip Guyton
(74) *Attorney, Agent, or Firm* — Sughrue Mion, PLLC; Richard C. Turner

(57) ABSTRACT

A programmable logic controller includes an error detection unit, a data memory storing error occurrence information indicating, for each error kind, whether the error detection unit has detected an error, an error automatic cancellation processing unit determining whether an error factor of each error has been eliminated and, when the error factor has been eliminated, performing an error cancellation process including a process to change the error occurrence information to error non-occurrence, and an error-automatic-cancellation-permission determination unit referring to an error automatic cancellation permission setting and determining, when the error detection unit detects an error, whether the error is canceled by the error automatic cancellation processing unit on the basis of the error automatic cancellation permission setting, wherein the error automatic cancellation processing unit performs the error cancellation process on the error that the error-automatic-cancellation-permission determination unit has determined that the error automatic cancellation processing unit is to cancel.

7 Claims, 7 Drawing Sheets

(52) U.S. Cl.
CPC ...... *G06F 11/0736* (2013.01); *G06F 11/0751* (2013.01); *G06F 11/0772* (2013.01); *G06F 11/0787* (2013.01); *G05B 2219/14107* (2013.01)

(56) References Cited

U.S. PATENT DOCUMENTS

| | | | | |
|---|---|---|---|---|
| 2008/0126882 | A1* | 5/2008 | Fulton | G05B 19/058 714/48 |
| 2008/0281475 | A1* | 11/2008 | Hirai | G05D 23/1931 700/300 |
| 2009/0174981 | A1* | 7/2009 | Mallon | G08B 3/10 361/114 |
| 2014/0019814 | A1* | 1/2014 | McNairy | G06F 11/2215 714/49 |

FOREIGN PATENT DOCUMENTS

| | | |
|---|---|---|
| EP | 0239780 A2 | 10/1987 |
| JP | 03-222007 A | 10/1991 |
| JP | 5-113807 A | 5/1993 |
| JP | 6-51815 A | 2/1994 |
| JP | 2000-347739 A | 12/2000 |
| JP | 2001-265431 A | 9/2001 |
| JP | 2002-73164 A | 3/2002 |
| JP | 2007-213341 A | 8/2007 |
| JP | 2007-304939 A | 11/2007 |
| JP | 2009-104246 A | 5/2009 |
| TW | I360049 B | 3/2012 |

OTHER PUBLICATIONS

Notice of Rejection issued Nov. 30, 2015 in JP Appln No. 2015-520757.
Decision of patent Grant issued Feb. 17, 2015 in JP Appln No. 2015-520757.
Communication dated Dec. 21, 2016 from the German Patent and Trademark Office in counterpart application No. 11 2014 003 065.1.
Notice of Rejection issued Nov. 30, 2015 in JP Appin No. 2015-520757.
Decision of patent Grant issued Feb. 17, 2016 in JP Appin No. 2015-520757.
Taiwanese Office Action for TW 103125233.
International Search Report for PCT/JP2014/061776 dated Jul. 15, 2014.

* cited by examiner

FIG.8

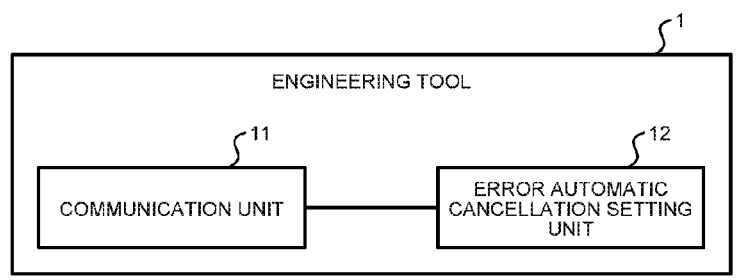

FIG.9

| SETTING ITEM | | |
|---|---|---|
| ITEM | | SETTING |
| ERROR AUTOMATIC CANCELLATION PERMISSION SETTING | | |
| GROUP NAME | ERROR NAME | |
| UNIT ABNORMALITY | | |
| | UNIT ABNORMALITY A (ERROR CODE 1) | AUTOMATIC CANCELLATION IS PERMITTED |
| | UNIT ABNORMALITY B (ERROR CODE 2) | AUTOMATIC CANCELLATION IS NOT PERMITTED |
| | ⋮ | ⋮ |
| | ⋮ | ⋮ |
| | | ⋮ |
| ⋮ | ⋮ | ⋮ |
| | ⋮ | ⋮ |
| BATTERY ABNORMALITY | | AUTOMATIC CANCELLATION IS PERMITTED |
| | ⋮ | ⋮ |
| | ⋮ | ⋮ |
| | BATTERY ABNORMALITY A (ERROR CODE n-1) | AUTOMATIC CANCELLATION IS PERMITTED |
| | BATTERY ABNORMALITY B (ERROR CODE n) | AUTOMATIC CANCELLATION IS PERMITTED |

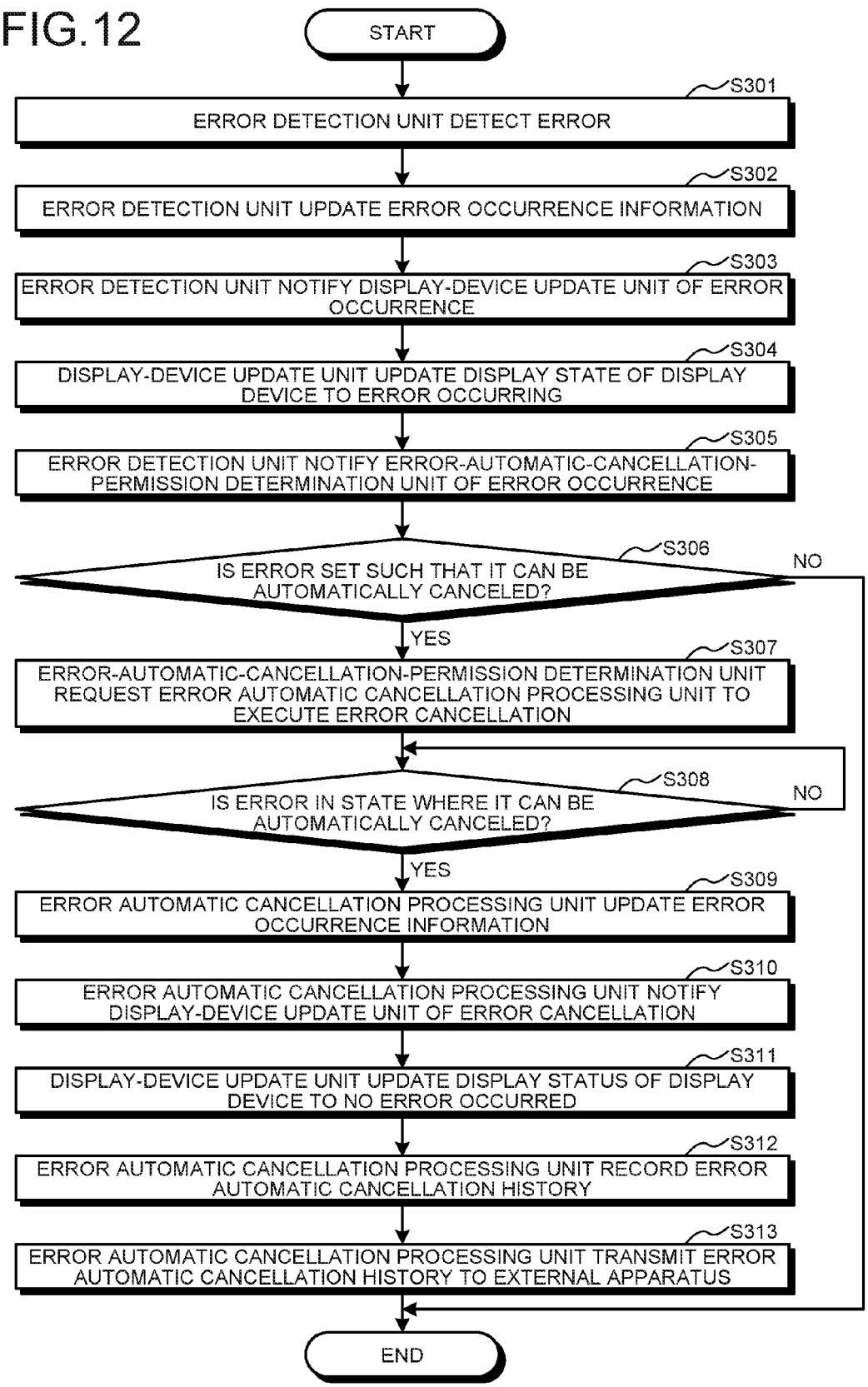

PROGRAMMABLE LOGIC CONTROLLER

CROSS REFERENCE TO RELATED APPLICATIONS

This application is a National Stage of International Application No. PCT/JP2014/061776 filed Apr. 25, 2014, the contents of which are incorporated herein by reference in their entirety.

FIELD

The present invention relates to a programmable logic controller that, after a factor contributing to various errors (hereinafter, referred to as an "error"), such as a detected abnormality, warning, or an abnormality in user definition, is eliminated, automatically cancels the error while continuing to be in control of itself without any manual operation by a user.

BACKGROUND

When programmable logic controllers detect errors, the programmable logic controllers can rearrange the errors in descending order of priority and can automatically perform an error handling operation and an error cancellation process in descending order of priority (see Patent Literature 1).

CITATION LIST

Patent Literature

Patent Literature 1: Japanese Patent Application Laid-Open No. 2007-213341

SUMMARY

Technical Problem

In a case where a programmable logic controller controls the system, even when an error is detected and then the error factor of the detected error is eliminated, the programmable logic controller is still in the state where the error is occurring. Therefore, in order to eliminate the error state of the programmable logic controller and clear the error display on the display device or the like, it is necessary to perform a manual operation by an engineering tool or the like or to restart the programmable logic controller. Accordingly, a loss has occurred because the maintenance costs for the manual error cancellation operation are necessary or the system is down. Furthermore, in facilities or apparatuses in which the system should be continuously controlled as much as possible, such as, in particular, a plant facility, there are many cases in which the system should never be down.

The programmable logic controller disclosed in Patent Literature 1 is configured such that the error cancellation process is automatically performed on the detected errors in descending order of priority. However, when the error is canceled, it is not checked whether or not the error factor has been eliminated; therefore, it is impossible to set the programmable logic controller in the error state when the error factor has not been eliminated and perform an operation of automatically canceling the error after the error factor is eliminated. Furthermore, in the state where the error factor has not been eliminated, the occurring-error state cannot be checked on the display device or the engineering tool connected to the programmable logic controller. That is, because the error is canceled without notifying a user of the occurrence of the error, there is a case in which it is difficult to take measures to prevent the error factor from occurring.

The present invention is made in view of the above, and it is an object of the present invention to obtain a programmable logic controller capable of reducing the maintenance costs or preventing the system from being down by automatically canceling the error when the error factor is eliminated after the error is detected.

Solution to Problem

In order to solve the above problems and achieve the object, an aspect of the present invention is a programmable logic controller capable of executing a control program on a basis of a signal input from an apparatus connected to the programmable logic controller, the programmable logic controller including: an error detection unit that detects an error that occurs while the control program is being executed; a storage unit that stores error occurrence information indicating, for each error kind, whether or not the error detection unit has detected an error; an error cancellation processing unit that determines whether or not an error factor has been eliminated for each error detected by the error detection unit and, when the error factor has been eliminated, performs an error cancellation process including a process to change the error occurrence information to non-occurrence of an error; an error-cancellation-permission-setting storage unit that stores a setting as to whether or not the error cancellation processing unit cancels an error for each error detected by the error detection unit; and an error cancellation permission determination unit that, when the error detection unit detects an error, determines whether or not the error is an error that is canceled by the error cancellation processing unit on a basis of information stored in the error-cancellation-permission-setting storage unit, wherein the error cancellation processing unit performs the error cancellation process on an error that the error cancellation permission determination unit has determined that the error cancellation processing unit is to cancel.

Advantageous Effects of Invention

A programmable logic controller according to the present invention exhibits an effect in that the occurring-error state can be checked in a state where an error factor has not been eliminated.

BRIEF DESCRIPTION OF DRAWINGS

FIG. 8 is a diagram illustrating a configuration of an engineering tool.

FIG. 9 is a diagram illustrating an example of a setting screen of the error automatic cancellation permission setting.

FIG. 12 is a flowchart illustrating an operation procedure of error detection and error automatic cancellation performed by the programmable logic controller according to the embodiment.

DESCRIPTION OF EMBODIMENTS

Exemplary embodiments of a programmable logic controller according to the present invention will be described below in detail with reference to the drawings. Note that, the present invention is not limited to the embodiments.

Embodiment.

Figure 1:
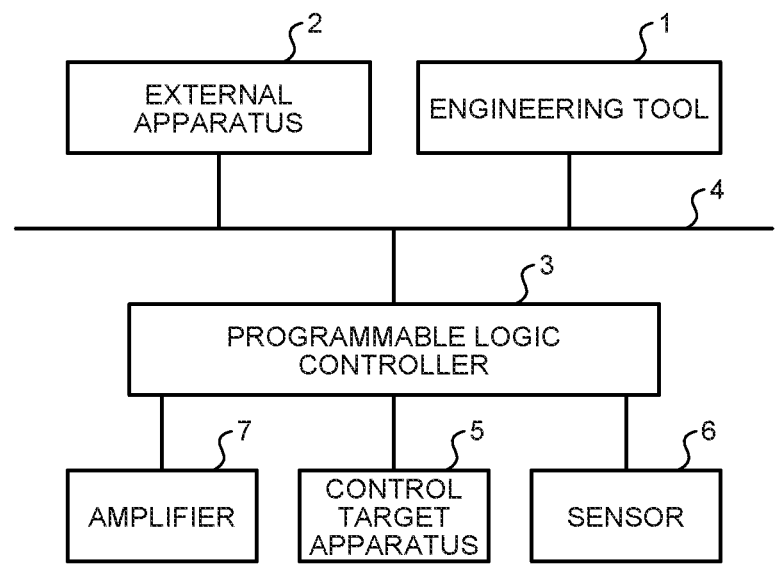
FIG. 1 is a diagram illustrating a configuration of an FA system in which a programmable logic controller according to an embodiment of the present invention is used.

FIG. 1 is a diagram illustrating a configuration of a factory automation (FA) system in which a programmable logic controller according to an embodiment of the present invention is used. A programmable logic controller 3 is connected to an engineering tool 1 via a communication medium, such as a network 4. Furthermore, the programmable logic controller 3 can be connected to an external apparatus 2, which is different from the engineering tool 1, via the network 4.

The programmable logic controller 3 is connected to a control target apparatus 5, a sensor 6, an amplifier 7, and the like. The programmable logic controller 3 executes a sequence program in accordance with a signal input from the control target apparatus 5 and the sensor 6, and controls the control target apparatus 5 and the amplifier 7 by outputting, to the control target apparatus 5 and the amplifier 7, an output signal generated by executing the sequence program. However, when performing the operation to control the control target apparatus 5 and the amplifier 7 (in other words, when executing the sequence program), the programmable logic controller 3 is not necessarily connected to the engineering tool 1.

Figure 2:
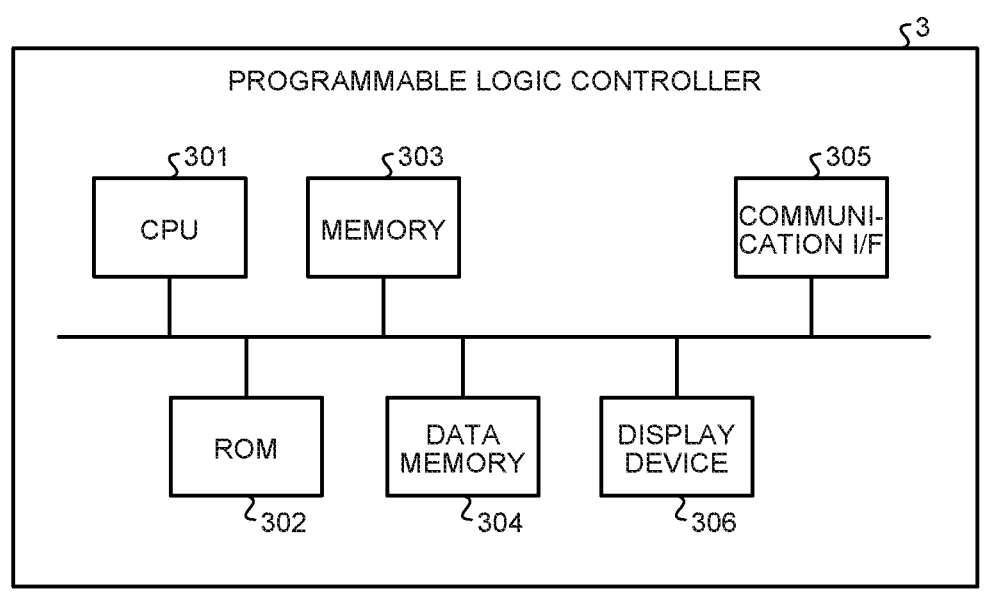
FIG. 2 is a diagram illustrating a configuration of an embodiment of the programmable logic controller according to the present invention.

FIG. 2 is a diagram illustrating a configuration of the embodiment of the programmable logic controller according to the present invention. The programmable logic controller 3 includes a CPU 301, a read only memory (ROM) 302, a memory 303, a data memory 304, a communication interface (I/F) 305, and a display device 306. The CPU 301 is a calculation device that executes firmware stored in the ROM 302. The ROM 302 stores the firmware executed by the CPU 301 in a non-volatile manner. A memory 303 is a work area used for the CPU 301 to execute the firmware. The data memory 304 is a device that stores information in a non-volatile manner and configured from one or more memory elements. The communication I/F 305 is an interface that communicates with the engineering tool 1 and the external apparatus 2 via the network 4. The display device 306 is a display device that displays the state of the programmable logic controller 3. A light emitting diode (LED) capable of changing the lighting color and the lighting pattern is used as a display device 306.

Figure 3:
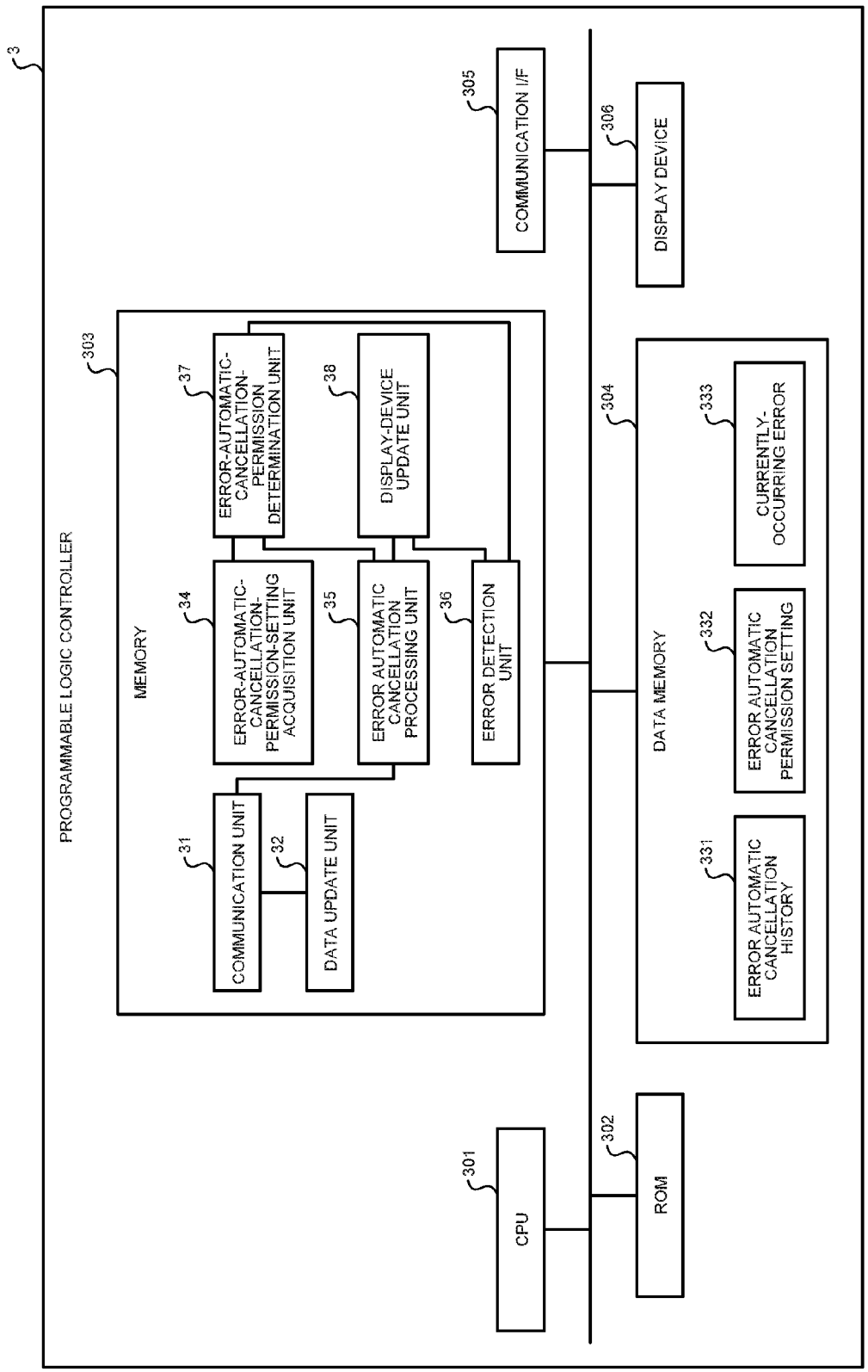
FIG. 3 is a diagram illustrating a functional configuration of the programmable logic controller.

The CPU 301 executes the firmware so as to form a plurality of functional units on the CPU 301 and the memory 303 used by the CPU 301 as the work area. FIG. 3 is a diagram illustrating a functional configuration of the programmable logic controller. In FIG. 3, all the functional units are illustrated on the memory 303. On the memory 303, a communication unit 31, a data update unit 32, an error-automatic-cancellation-permission-setting acquisition unit 34, an error automatic cancellation processing unit 35, an error detection unit 36, an error-automatic-cancellation-permission determination unit 37, and a display-device update unit 38 are formed.

The communication unit 31 is a functional unit that communicates with the engineering tool 1 and the external apparatus 2 via a communication medium, such as a network. The data update unit 32 receives an error automatic cancellation permission setting from the communication unit 31 and stores the received error automatic cancellation permission setting in the data memory 304 as the error automatic cancellation permission setting. Furthermore, the data update unit 32 stores the error automatic cancellation permission setting in the data memory 304, and then notifies the error-automatic-cancellation-permission-setting acquisition unit 34 of the storing. The error-automatic-cancellation-permission-setting acquisition unit 34 reads the error automatic cancellation permission setting from the data memory 304 and outputs the setting to the error-automatic-cancellation-permission determination unit 37. The error-automatic-cancellation-permission-setting acquisition unit 34 reads an error automatic cancellation permission setting 332 from the data memory 304 when the programmable logic controller is started by, for example, turning on the power or restarted by means of a reset or the like and when the data update unit 32 notifies the error-automatic-cancellation-permission-setting acquisition unit 34 that the data is updated.

Specific examples of error factors are described below. A battery error occurs due to the error factor when the battery has run out or is about to run out, and this error factor is eliminated by replacing the battery. A unit abnormality occurs due to the error factor when an abnormality in the units constituting the programmable logic controller 3 is detected, and this error factor is eliminated by replacing the unit in which an abnormality is detected with a normal unit. A calculation error occurs due to the error factor when the calculation of the program is incorrect, such as division by zero, and this error factor is eliminated when the calculation is correctly performed at the same calculation point in the recalculation.

Figure 4:
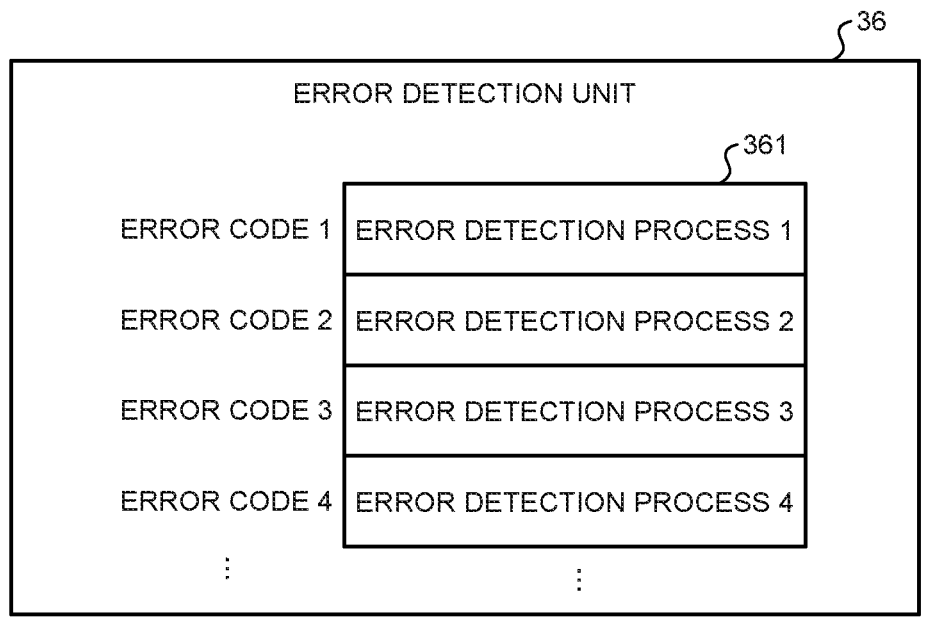
FIG. 4 is a diagram illustrating an example of an error detection process defined in an error detection unit.

The error detection unit 36 detects the error that occurs in the programmable logic controller 3 while the control program is being executed. In the error detection unit 36, an error detection process 361 different for each error code can be defined. Here, an error detection process n indicates the process to detect an error code n. The same error detection process can be defined for different errors. Furthermore, a plurality of error codes and a plurality of error detection processes can be defined for one programmable logic controller. FIG. 4 is a diagram illustrating an example of the error detection process defined in the error detection unit. In the error detection unit 36, an error detection process 1 to an error detection process n are defined as the error detection process 361.

Figure 5:
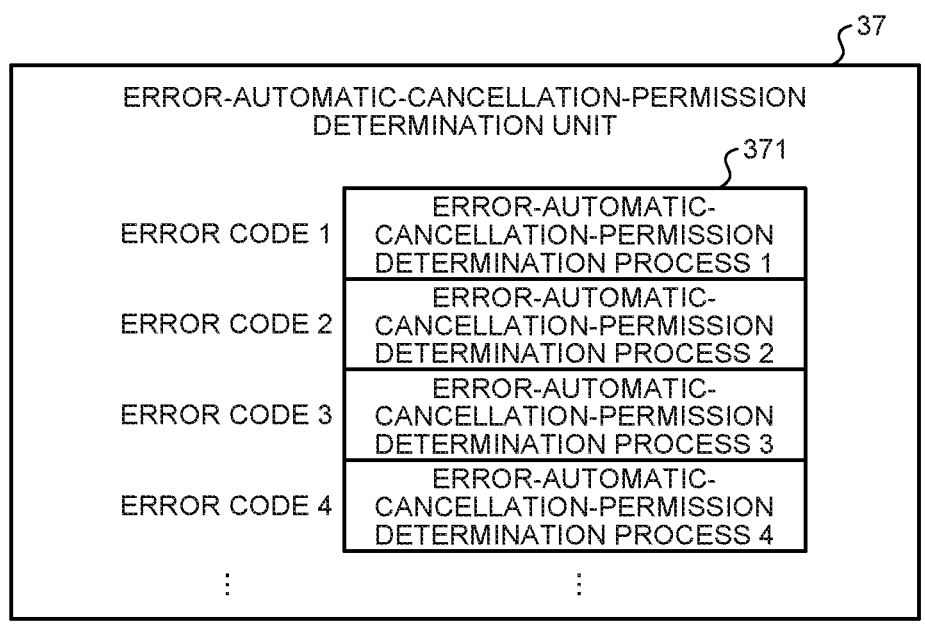
FIG. 5 is a diagram illustrating an example of an error-automatic-cancellation-permission determination unit.

The error-automatic-cancellation-permission determination unit 37 determines, on the basis of the error automatic cancellation permission setting acquired by the error-automatic-cancellation-permission-setting acquisition unit 34, whether the error code n can be automatically canceled. FIG. 5 is a diagram illustrating an example of the error-automatic-cancellation-permission determination unit. In the error-automatic-cancellation-permission determination unit 37, a procedure of an error-automatic-cancellation-permission determination process 371, which is the process to determine whether or not the error can be automatically canceled, is registered for the error code 1 to the error code n.

The display-device update unit 38 performs the process to update the display content of the display device 306.

In the data memory 304, an error automatic cancellation history 331, the error automatic cancellation permission setting 332, and a currently-occurring error 333 are stored. The data memory 304 is a storage unit that stores error occurrence information indicating, for each error kind, whether or not the error detection unit 36 has detected the error.

When the error automatic cancellation processing unit 35 automatically cancels the error, the error automatic cancellation processing unit 35 additionally records, in the error automatic cancellation history 331, the information indicating which error has been automatically canceled.

Figure 6:
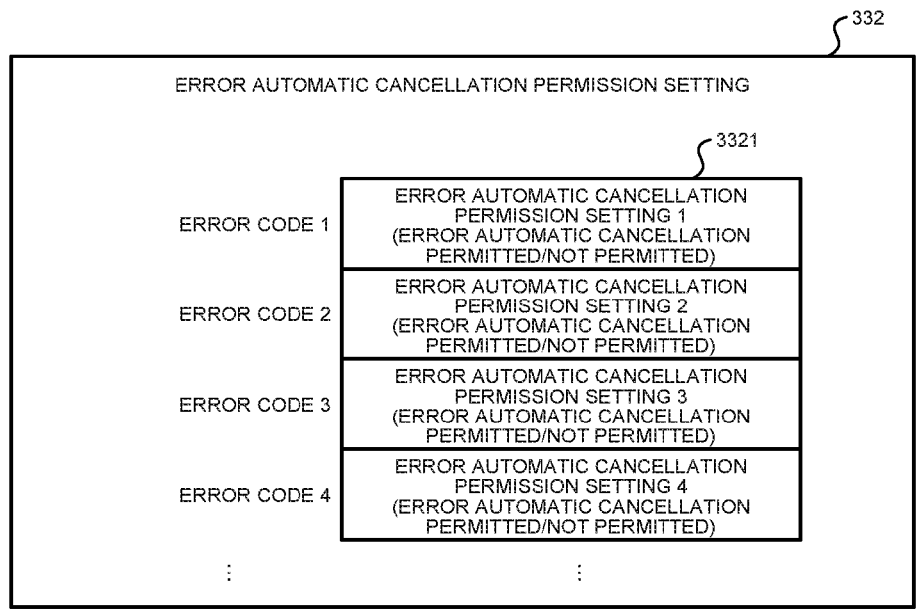
FIG. 6 is a diagram illustrating an example of an error automatic cancellation permission setting.

The error automatic cancellation permission setting 332 is information indicating whether or not the error corresponding to each error code is the error that can be automatically canceled. FIG. 6 is a diagram illustrating an example of the error automatic cancellation permission setting. The error automatic cancellation permission setting 332 includes an error automatic cancellation permission setting 3321, which is the information indicating whether or not the error corresponding to the error code n (n is the total number of errors detected by the programmable logic controller 3) can be automatically canceled. That is, the error automatic cancellation permission setting 332 includes the error automatic cancellation permission setting 3321 for all of the errors that can be detected by the programmable logic controller 3.

As described below, whether or not the error can be automatically canceled can be set not only for each error code individually, but also for each of the groups into which a plurality of error codes has been classified.

Figure 7:
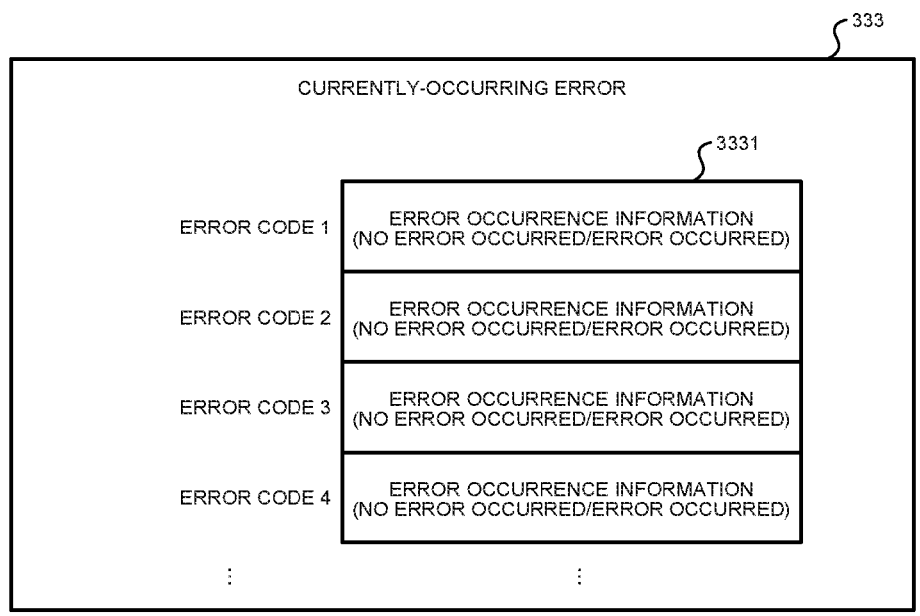
FIG. 7 is a diagram illustrating an example of a currently-occurring error.

The currently-occurring error 333 is information indicating, for each error code, whether or not the error is currently occurring. FIG. 7 is a diagram illustrating an example of the currently-occurring error. The currently-occurring error 333 includes error occurrence information 3331 indicating whether or not the error corresponding to the error code n is currently occurring.

FIG. 8 is a diagram illustrating a configuration of the engineering tool that is used for the FA system together with the programmable logic controller according to the embodiment. The engineering tool 1 includes a communication unit 11 and an error automatic cancellation setting unit 12. The communication unit 11 is a functional unit that communicates with the programmable logic controller 3 via a communication medium, such as the network 4. The error automatic cancellation setting unit 12 is a functional unit that accepts a setting operation of the error automatic cancellation permission from a user.

FIG. 9 is a diagram illustrating an example of a setting screen of the error automatic cancellation permission setting. An error automatic cancellation permission setting screen 50 is displayed on the engineering tool 1 when the setting of the error automatic cancellation permission is performed. The error automatic cancellation permission setting screen 50 includes an error display column 51 to display a list of errors that can be detected by the programmable logic controller 3 and a setting column 52 to display whether the error can be automatically canceled. The errors are classified into groups according to the error content, and a group name display column 53 to display the group name of each group is provided. Either "automatic cancellation permitted" or "automatic cancellation not permitted" can be set in the field corresponding to each error in the setting column 52 as the error automatic cancellation permission setting, and the setting content of the error automatic cancellation permission setting is stored in the engineering tool 1. When the user performs the operation to request the engineering tool 1 to forward the error automatic cancellation permission setting, the setting content of the error automatic cancellation permission setting is forwarded to the programmable logic controller 3 via the network 4 and stored as the error automatic cancellation permission setting 332.

On the error automatic cancellation permission setting screen 50 illustrated in FIG. 9, "automatic cancellation permitted" or "automatic cancellation not permitted" can be set in the field corresponding to the group name in the setting column 52 and, when the automatic cancellation permission is set in the field corresponding to the group name, the same setting is applied to all of the errors in the group. In FIG. 9, with regard to the error that belongs to the unit abnormality group, the automatic cancellation permission is not set in the field corresponding to the group name in the setting column; therefore, the automatic cancellation permission is individually set for each error. In contrast, with regard to the error that belongs to the battery abnormality group, the automatic cancellation permission is set in the field corresponding to the group name in the setting column; therefore, the same setting is applied to all of the errors in the group.

Figure 10:
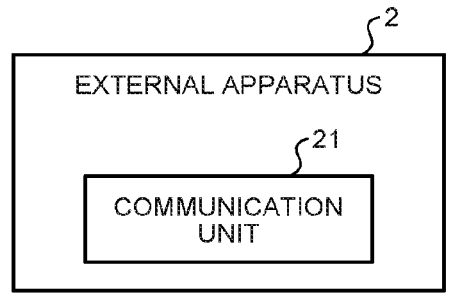
FIG. 10 is a diagram illustrating a configuration of an external apparatus.

FIG. 10 is a diagram illustrating a configuration of the external apparatus that is used for the FA system together with the programmable logic controller according to the embodiment. The external apparatus 2 includes a communication unit 21. The communication unit 21 is a functional unit that communicates with the programmable logic controller 3 via a communication medium, such as the network 4. The external apparatus 2 is an apparatus, such as a personal computer or a programmable display apparatus.

Figure 11:
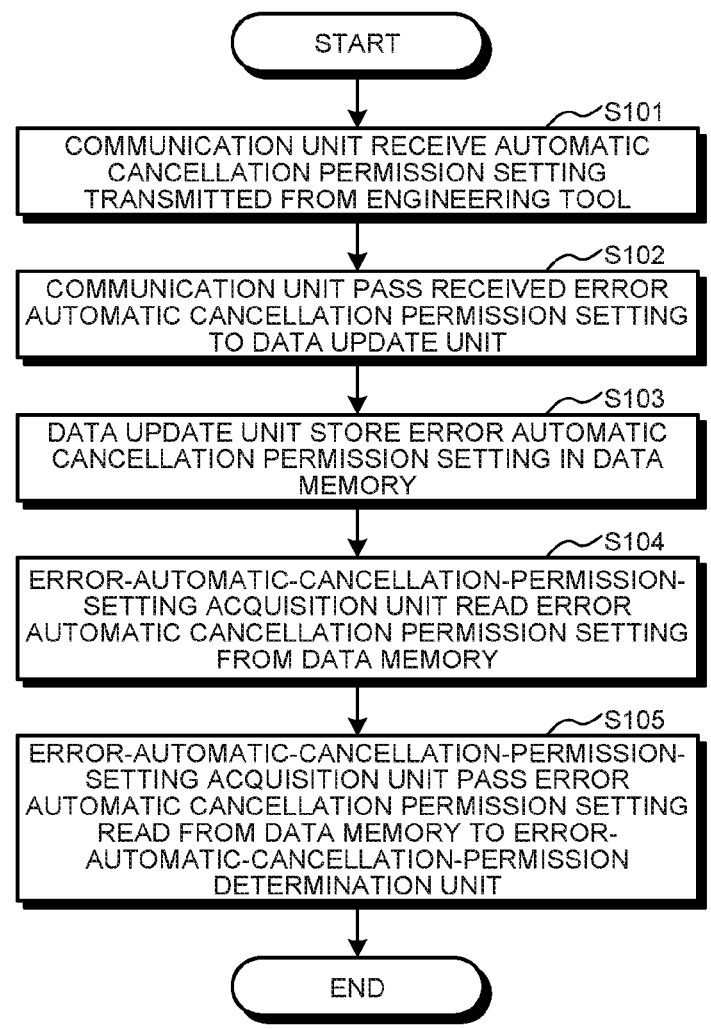
FIG. 11 is a flowchart illustrating the procedure of an operation performed by the programmable logic controller in a setting stage.

FIG. 11 is a flowchart illustrating the procedure of an operation performed by the programmable logic controller in a setting stage. The operation of the programmable logic controller 3 in the setting stage will be described with reference to the flowchart of FIG. 11. The processing procedure (step) numbers are denoted as S101, S102, . . . in the description. With the engineering tool 1, the user performs the error automatic cancellation permission setting at the error automatic cancellation setting unit 12. The error automatic cancellation permission setting accepted by the error automatic cancellation setting unit 12 is passed to the communication unit 11 and transmitted from the communication unit 11 to the programmable logic controller 3. The communication unit 31 of the programmable logic controller 3 receives the automatic cancellation permission setting transmitted from the engineering tool 1 (step S101). The communication unit 31 passes the received error automatic cancellation permission setting to the data update unit 32 (step S102). The data update unit 32 stores the error automatic cancellation permission setting received form the communication unit 31 in a data memory 304 as the error automatic cancellation permission setting 332 (step S103). The error automatic cancellation permission setting 332 stores the setting as to whether or not the error can be automatically canceled for each error code (the error automatic cancellation permission setting 3321).

The error-automatic-cancellation-permission-setting acquisition unit 34 reads the error automatic cancellation permission setting 332 stored in the data memory 304 (step S104). Then, the error-automatic-cancellation-permission-setting acquisition unit 34 outputs the error automatic cancellation permission setting 332 to the error-automaticcancellation-permission determination unit 37 (step S105). With the above procedure, the error-automatic-cancellation-permission determination unit 37 becomes the state where it is possible to determine whether or not the error corresponding to each error code can be automatically canceled.

FIG. 12 is a flowchart illustrating the operation procedure of error detection and error automatic cancellation performed by the programmable logic controller according to the embodiment. The error detection and the error automatic cancellation performed by the programmable logic controller 3 will be described with reference to the flowchart of FIG. 12. The processing procedure (step) numbers are denoted as S301, S302, . . . in the description.

When the error code n is detected by performing the error detection process n (step S301), the error detection unit 36 updates the value of the error occurrence information 3331 corresponding to the error code n in the currently-occurring error 333 from "no error occurred" to "error occurred" (step S302). In addition, the error detection unit 36 notifies the display-device update unit 38 that the error corresponding to the error code n occurs (step S303). The display-device update unit 38 updates the state of the display device 306 so as to display that the error is occurring (step S304).

Furthermore, the error detection unit 36 notifies the error-automatic-cancellation-permission determination unit 37 that the error corresponding to the error code n is occurring (step S305). The error-automatic-cancellation-permission determination unit 37 performs the determination process by referring to the error automatic cancellation permission setting 332 that has been received from the error-automatic-cancellation-permission-setting acquisition unit 34, to determine whether it is possible to automatically cancel the error corresponding to the error code n that is occurring and is detected by the error detection unit 36 (step S306). When the error-automatic-cancellation-permission determination unit 37 determines that the error corresponding to the error code n can be automatically canceled (step S306/Yes), the error-automatic-cancellation-permission determination unit 37 requests the error automatic cancellation processing unit 35 to perform the error automatic cancellation process on the error code n (step S307). When the error-automatic-cancellation-permission determination unit 37 determines that the error corresponding to the error code n cannot be automatically canceled (step S306/No), the process is terminated.

The error automatic cancellation processing unit 35 periodically determines whether or not the error on which the error automatic cancellation processing unit 35 is requested to perform the error automatic cancellation process by the error-automatic-cancellation-permission determination unit 37 becomes a state where it can be automatically canceled (step S308). When the error is not in a state where it can be automatically canceled (step S308/NO), the error automatic cancellation processing unit 35 determines whether or not the error becomes the state where it can be automatically canceled after a predetermined time has passed.

For example, in the case of the battery error, after the battery is replaced, the error automatic cancellation processing unit 35 determines that the error factor is eliminated and the error becomes the state where it can be automatically canceled. As another example, in the case of the unit abnormality, when the unit is replaced while the programmable logic controller 3 is being powered on and then the programmable logic controller 3 recognizes that the replaced unit is normal, the error automatic cancellation processing unit 35 determines that the error factor is eliminated and the error becomes the state where it can be automatically canceled. Furthermore, as the other example, in the case of the calculation error, when the calculation can be performed at the same calculation point in the recalculation while the programmable logic controller 3 is being powered on, the error automatic cancellation processing unit 35 determines that the error factor is eliminated and the error becomes the state where it can be automatically eliminated. The automatic cancellation of the calculation error is performed, for example, when the calculation error occurs because of the inversion of data due to the effect of disturbances or the like during the operation of the programmable logic controller 3 and the calculation thereafter can be correctly performed without the data being inverted. More specifically, a certain value that should be divided by the binary number "10" is divided by "00"; therefore, the calculation error occurs, and, thereafter, the error factor is eliminated by dividing the value by "10" at the same calculation point.

When the error becomes the state where it can be automatically canceled (step S308/Yes), the error automatic cancellation processing unit 35 performs the following steps S309 to S313 as the error automatic cancellation process.

The error automatic cancellation processing unit 35 updates the error occurrence information 3331 of the currently-occurring error 333 from "error occurred" to "no error occurred" (step S309). Furthermore, the error automatic cancellation processing unit 35 notifies the display-device update unit 38 that the error has been canceled (step S310). The display-device update unit 38 that has received the notification from the error automatic cancellation processing unit 35 updates the display status of the display device 306 to a display status indicating no error (step S311). Furthermore, the error automatic cancellation processing unit 35 additionally records, as the history, the information indicating that the error has been automatically canceled in the error automatic cancellation history 331 (step S312). Although the case in which the error automatic cancellation history 331 is stored in the data memory 304 is exemplified in the description, an external memory (not illustrated) may be connected to the programmable logic controller 3 and the error automatic cancellation history may be stored in the external memory. Furthermore, the error automatic cancellation processing unit 35 outputs the error cancellation history to the communication unit 31. Thus, the error automatic cancellation processing unit 35 transmits the error automatic cancellation history to the communication unit 21 of the external apparatus 2 via the communication unit 31 (step S313).

In the present embodiment, the programmable logic controller 3 can define, for each error, the error detection process and the determination process as to whether or not the error factor of the corresponding error has been eliminated (i.e., the error automatic cancellation determination process). Therefore, the error factor elimination determination process is periodically executed while the error is occurring, and then, when the error factor is eliminated, the error automatic cancellation can be executed. A series of processes from the error detection to the error automatic cancellation can be performed while continuing the control.

The error automatic cancellation processing unit 35 performs the error automatic cancellation process on the detected error only when the detected error has been set in the error auto cancellation permission setting 332 such that the error auto cancellation is performed. The setting can be defined for each error type, and when the setting is changed while the programmable logic controller 3 is operating, the data update unit 32 immediately reflects the setting content after the change in the data memory 304 (more specifically, in the error automatic cancellation permission setting 332); therefore, the process can be continued on the basis of the new setting.

When the error automatic cancellation processing unit 35 automatically cancels the error, the display-device update unit 38 updates the display content of the display device 306. Thus, in the state where the error factor has not been eliminated, the occurring-error state can be checked on the display device 306. Furthermore, because the currently-occurring error 333 and the error automatic cancellation history 331 are stored in a storage medium (i.e., the data memory 304) in the programmable logic controller 3, in the state where the error factor has not been eliminated, the occurring-error state can be checked on the engineering tool 1 connected to the programmable logic controller 3. Moreover, because the history on the error automatic cancellation is transmitted to the external apparatus 2, in the state where the error factor has not been eliminated, the occurring-error state can be checked on the external apparatus 2.

The programmable logic controller 3 according to the present embodiment automatically cancels the error after the error factor is eliminated; therefore, the maintenance costs for the manual error cancellation operation can be reduced and the loss generated when the system is down, e.g., when the system is being restarted, can be avoided. Furthermore, the programmable logic controller 3 can be applied to the facilities or apparatuses in which the system should not be easily shut down, such as, in particular, a plant facility.

Moreover, the programmable logic controller 3 according to the present embodiment can define the setting for each automatic cancellation error; therefore, a flexible operation can be implemented for each system.

Furthermore, when the error is automatically canceled, the programmable logic controller 3 according to the present embodiment can store the error cancellation history in the data memory 304 in the programmable logic controller 3 or the external memory attached to the programmable logic controller 3, and can notify the external apparatus of the error cancellation history. By checking such a history, the details of the operation state, such as the error occurrence or the error automatic cancellation, can be checked.

Furthermore, the setting as to whether or not the error automatic cancellation is permitted can be changed without shutting down the system; therefore, it is possible to avoid the loss generated when the system is down, e.g., when the system is being restarted, even when the setting needs to be changed after the system is started.

In the above embodiment, although a configuration is exemplified in which the user is notified by the display device that the error is occurring, the display device does not necessarily need to be used as long as the user can be notified of the error occurrence. For example, the user can be notified of the error occurrence with sound by using a speaker or with vibration by using a vibrator.

As described above, the programmable logic controller according to the present embodiment automatically cancels the error when the error factor is eliminated after the error is detected. Therefore, in the state where the error factor has not been eliminated, it is possible to check the occurring-error state on the display device or on the engineering tool connected to the programmable logic controller. Thus, it is seldom that the error occurs and is canceled without the user being aware of this, and basic measures to prevent the error factor from occurring are easily taken.

INDUSTRIAL APPLICABILITY

As described above, the programmable logic controller according to the present invention is useful in that an error is automatically canceled when the error factor is eliminated after the error is detected.

REFERENCE SIGNS LIST 1 engineering tool, 2 external apparatus, 3 programmable logic controller, 4 network, 5 control target apparatus, 6 sensor, 7 amplifier, 11, 21, 31 communication unit, 12 error automatic cancellation setting unit, 32 data update unit, 34 error-automatic-cancellation-permission-setting acquisition unit, 35 error automatic cancellation processing unit, 36 error detection unit, 37 error-automatic-cancellation-permission determination unit, 38 display-device update unit, 301 CPU, 302 ROM, 303 memory, 304 data memory, 305 communication I/F, 306 display device, 331 error automatic cancellation history, 332 error automatic cancellation permission setting, 333 currently-occurring error, 361 error detection process, 371 error-automatic-cancellation-permission determination process, 3321 error automatic cancellation permission setting, 3331 error occurrence information.

The invention claimed is:

1. A programmable logic controller capable of executing a control program on a basis of a signal input from an apparatus connected to the programmable logic controller, the programmable logic controller comprising:
an error detection unit that detects an error that occurs while the control program is being executed;
a storage unit that stores error occurrence information indicating, for each error kind, whether or not the error detection unit has detected an error;
an error-cancellation-permission-setting storage unit that stores information indicating whether or not each error that the error detection unit detects is an error capable of being automatically canceled;
an error cancellation permission determination unit that, when the error detection unit detects an error, determines whether or not the error is an error capable of being automatically canceled on a basis of information stored in the error-cancellation-permission-setting storage unit;
an error cancellation processing unit that determines whether or not an error factor has been eliminated for an error that the error cancellation permission determination unit determines to be an error capable of being automatically canceled and, when the error factor has been eliminated, automatically performs an error cancellation process including a process to change the error occurrence information to non-occurrence of an error; and
a notification device that issues a notification that indicates that an error is occurring when the error detection unit detects the error
the error cancellation process includes a process to cancel a notification that is issued from the notification device indicating that an error is occurring and a process to record, in an internal memory or an external memory attached to the programmable logic controller, information indicating that the process to change the error occurrence information to non-occurrence of an error has been performed,
wherein the information is stored in the error-cancellation-permission-setting storage unit prior to executing error detection by the error detection unit.

2. The programmable logic controller according to claim 1, further comprising a data update unit that performs a process to update a setting content to be stored in the error-cancellation-permission-setting storage unit independently from execution of the control program.

3. The programmable logic controller according to claim 1, wherein the information stored in the error-cancellation-permission-setting storage unit comprises a group field for a group of errors and an individual field for each of the errors, which are set to indicate whether automatic cancellations of the respective error are permitted.

4. The programmable logic controller according to claim 1, wherein, for each error that the automatic cancellation is permitted based on the information in the error-cancellation-permission-setting storage unit, the error cancellation processing unit periodically automatically determines if the respective error is no longer occurring based on whether the error factor has been eliminated without user input and in response to the determining that the respective error is no longer occurring, automatically clears the error by executing the error cancellation process and wherein the storage unit further stores a cancellation history comprising information regarding occurrence of the error and respective automatic cancellation.

5. A programmable logic controller capable of executing a control program on a basis of a signal input from an apparatus connected to the programmable logic controller, the programmable logic controller comprising:
an error detection unit that detects an error that occurs while the control program is being executed;
a storage unit that stores error occurrence information indicating, for each error kind, whether or not the error detection unit has detected an error;
an error-cancellation-permission-setting storage unit that stores information indicating whether or not each error that the error detection unit detects is an error capable of being automatically canceled;
an error cancellation permission determination unit that, when the error detection unit detects an error, determines whether or not the error is an error capable of being automatically canceled on a basis of information stored in the error-cancellation-permission-setting storage unit;
an error cancellation processing unit that determines whether or not an error factor has been eliminated for an error that the error cancellation permission determination unit determines to be an error capable of being automatically canceled and, when the error factor has been eliminated, automatically performs an error cancellation process including a process to change the error occurrence information to non-occurrence of an error; and
a notification device that issues a notification that indicates that an error is occurring when the error detection unit detects the error, wherein
the error cancellation process includes a process to cancel a notification that is issued from the notification device indicating that an error is occurring and a process to transmit, to an external apparatus, information indicating that the process to change the error occurrence information to non-occurrence of an error has been performed,
wherein the information is stored in the error-cancellation-permission-setting storage unit prior to executing error detection by the error detection unit.

6. The programmable logic controller according to claim 5, further comprising a data update unit that performs a process to update a setting content to be stored in the error-cancellation-permission-setting storage unit independently from execution of the control program.

7. A programmable logic controller capable of executing a control program on a basis of a signal input from an apparatus connected to the programmable logic controller, the programmable logic controller comprising:
an error detection unit that detects an error that occurs while the control program is being executed;
a storage unit that stores error occurrence information indicating, for each error kind, whether or not the error detection unit has detected an error;
an error-cancellation-permission-setting storage unit that stores information indicating whether or not each error that the error detection unit detects is an error capable of being automatically canceled;
an error cancellation permission determination unit that, when the error detection unit detects an error, determines whether or not the error is an error capable of being automatically canceled on a basis of information stored in the error-cancellation-permission-setting storage unit;
an error cancellation processing unit that determines whether or not an error factor has been eliminated for an error that the error cancellation permission determination unit determines to be an error capable of being automatically canceled and, when the error factor has been eliminated, automatically performs an error cancellation process including a process to change the error occurrence information to non-occurrence of an error; and
a data update unit that performs a process to update a setting content to be stored in the error-cancellation-permission-setting storage unit independently from execution of the control program,
wherein the information is stored in the error-cancellation-permission-setting storage unit prior to executing error detection by the error detection unit.

* * * * *